United States Patent [19]
Orensten et al.

[11] 3,957,634
[45] May 18, 1976

[54] FILTRATION MEANS AND METHOD

[76] Inventors: Henry E. Orensten; Vivian C. Orensten, both of 8724 Westmoreland Lane, St. Louis Park, Minn. 55426

[22] Filed: May 20, 1974

[21] Appl. No.: 471,319

[52] U.S. Cl. .................................. 210/11; 210/169; 210/336
[51] Int. Cl.$^2$ ...................... B01D 29/24; C02B 5/10
[58] Field of Search ............... 210/73, 74, 169, 340, 210/341, 448, 452, 11, 17, 335, 336

[56] References Cited
UNITED STATES PATENTS

| | | | |
|---|---|---|---|
| 3,291,562 | 12/1966 | Anderson | 210/73 X |
| 3,292,792 | 12/1966 | Falkenberg et al. | 210/169 X |
| 3,313,421 | 4/1967 | Falkenberg et al. | 210/169 X |
| 3,347,390 | 10/1967 | Tietz et al. | 210/448 |
| 3,396,847 | 8/1968 | Englesberg | 210/335 |
| 3,598,243 | 8/1971 | Gutkowski | 210/340 |
| 3,723,304 | 3/1973 | Storck | 210/169 X |
| 3,738,494 | 6/1973 | Willinger et al. | 210/169 |

Primary Examiner—Thomas G. Wyse
Attorney, Agent, or Firm—Thomas M. Meshbesher

[57] ABSTRACT

In the disclosed aquarium system, the aquarium water is purified in a biological/mechanical external filtration means which can also include chemical adsorption elements, if desired. The filtration means typically comprises (a) a pre-filtration zone, containing a relatively "coarse" filter element (e.g. with a pore size greater than 100 microns), and (b) a parallel flow zone containing a "fine" filter element (e.g. with a pore size less than 100 microns) and at least one cultured filter element. The culture of the cultured filtered element typically contains nitrifying bacteria, which help keep the free ammonia concentration in the aquarium system at a low, nontoxic level or even negligible level. The "fine" filter element in parallel with the cultured filter element permits high flow rates through the system and removes fine detritus. Thus, the parallel flow zone permits rapid and efficient biological/mechanical (or, if desired, biological/mechanical/chemical) filtration coupled with low fluid flow resistance. The "coarse" filter in the pre-filtration zone removes coarse detritus. When a culture forms in the detritus trapped in the "coarse" filter, the resulting cultured filter is useful as a biological element in the parallel flow zone of the same (or different) filtration means.

12 Claims, 6 Drawing Figures

U.S. Patent  May 18, 1976  Sheet 1 of 2  3,957,634
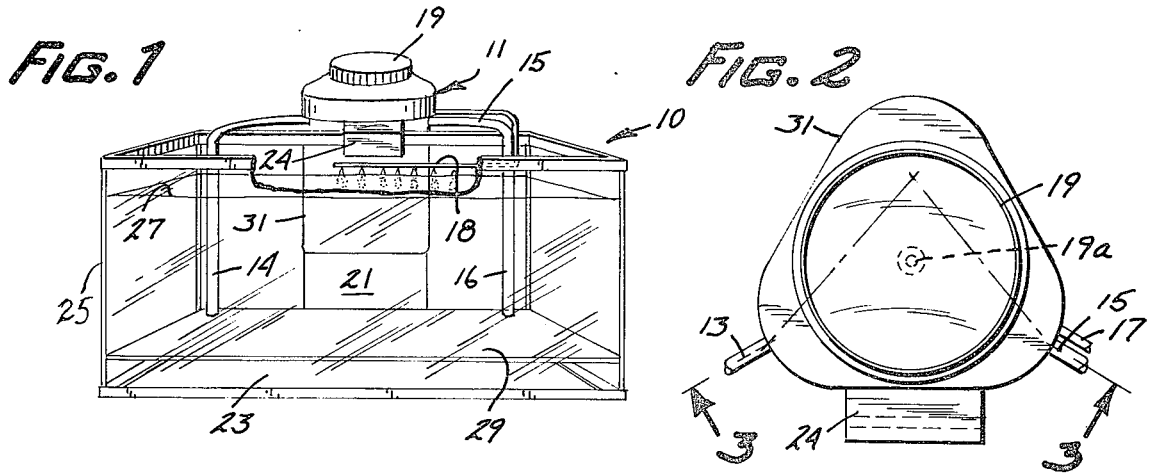
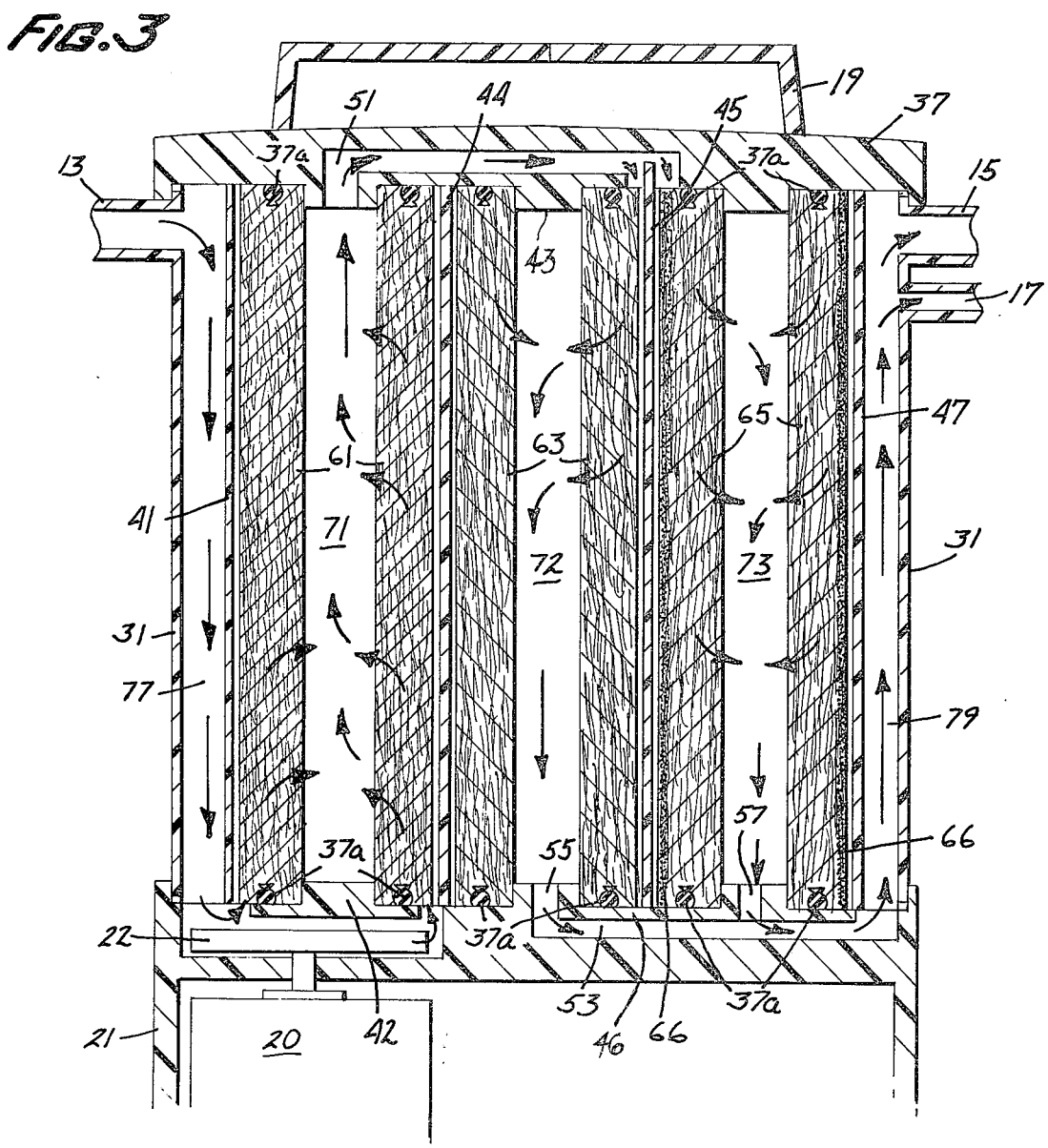

FILTRATION MEANS AND METHOD

FIELD OF THE INVENTION

This invention relates to methods and devices for filtering or purifying the water in aquatic life support systems, e.g. aquariums (including home or hobby aquariums) or holding tanks or stock tanks for fish, crustaceans, invertebrates and other fresh water or marine aquatic life. An aspect of this invention relates to preventing or controlling the build-up of toxic substances in the water of the aquatic life support system, e.g. the ammonia resulting from the action of heterotrophic bacteria on nitrogenous substrates such as uneaten proteinaceous fish food, fish excrement, and other sources of proteins and amino acids; and the ammonia respired or excreted by aquatic animals. Another aspect of this invention relates to a biologically active filtration device, acting in dual purpose as a mechanical filter, for either fresh water or marine-type aquariums. Still another aspect of this invention relates to a filtration device and method particularly well suited to an aquarium or other aquatic life support system with a flow control plate in the water tank; see U.S. Pat. No. 3,722,685 (Orensten et al.), issued Mar. 27, 1973.

DESCRIPTION OF THE PRIOR ART

An aquarium or the like is a miniature ecosystem. The aquatic life within this ecosystem produce metabolites and wastes, consume oxyen, and slowly poison their own environment. Some form of water purification or filtration is eventually needed to reduce mortality and disease.

There are several fundamentally different approaches to aquarium purification or filtration. In one approach, which relies heavily on bacterial action, water in the aquarium tank (or holding tank or stock tank, as the case may be) circulates through a filter bed, located inside the tank, which comprises gravel and a suitable supporting structure. This filtration method is sometimes called "under gravel" filtration. In another approach, the water is circulated from the tank to an external filtration zone and returned from this external zone to the tank. In its most efficient form, this latter type of system typically uses a powered water pump which exerts either a positive displacement action or an impeller action directly on the circulating flow of water. However, a gravity flow can also be used in connection with an external filter. Furthermore, combinations of under gravel filters and external power filters have been suggested.

The principles of external filtration can be mechanical, chemical, biological, or some combination of any of these. Biological or biological/mechanical filtration appears to be the most effective and the least disturbing to the aquatic ecosystem, since it takes advantage of the so-called nitrogen cycle to convert toxic metabolites and wastes in the water (e.g. ammonia) to relatively harmless or relatively less harmful substances (e.g. to nitrites and ultimately to nitrates or even fixed nitrogen). For a detailed description of the nitrogen cycle, see Stephen H. Spotte, *Fish and Invertebrate Culture*, Wiley-Interscience, New York, New York, 1970, pages 3 – 21.

It has been suggested in aquarium literature that organic matter in the aquarium water can build up in an external filter (e.g. of the gravity flow type) and provide a nutrient medium for microorganisms (bacterial, algae, etc.) which reduce levels of toxicity in the water. A recent development of this type is the so-called "algae" filter. It has also been suggested that a "dirty" filter (which contains this nutrient medium) should be retained in the system as long as is reasonably possible, e.g. by replacing only part of the filter material when it becomes clogged and begins to strongly resist fluid flow. See *Tropical Fish Hobbyist*, Vol. XX, September, 1971, pp. 85, 88, and 89.

As noted previously, it has been suggested to use an undergravel filter in combination with an external power filter. Many other combinations of filters and filter beds are known, which may involve arranging filter elements or beds in series and/or in parallel. As representative of this prior art, see the following U.S. Pat. Nos. 2,594,474 (McGrath); 3,661,262 (Sanders); 3,146,195 (Berardi); 3,371,789 (Hense); 3,262,570 )Gailitis); 3,513,978 (Newsteder).

A particularly convenient type of filter structure is one which the core is removable; this is well illustrated in U.S. Pat. Nos. 3,272,717 (Canterbury) and 3,292,792 (Falkenberg et al). The '792 (Falkenberg et al.) patent suggests that certain types of resin-impregnated filter elements can absorb nitrogenous matter.

In the aforementioned Orensten et al. patent (U.S. Pat. No. 3,722,685), the external filtering action is discussed in column 5, line 4 et seq. Experiments with this filtering arrangement establish that good biological filtering action can be obtained with the highly convenient integral, solid, porous removable core filter elements (e.g. the cellulosic type, the woven fibrous type, etc.). However, replacement of the clogged or "dirty" filter core with a fresh filter core brings on the so-called "new tank syndrome" (increased mortality or disease in the aquatic life attributed to temporary lack of sufficient biological action), and even a well-cultured, biologically active filter core may not be adequate for marine tanks or crowded fresh water tanks.

SUMMARY OF THE INVENTION

It has now been discovered that improved biological filtering action for both fresh water and marine aquariums can be obtained in the external filtration zone by a series-parallel combination of filter elements. The water entering the filter zone preferably passes first through a pre-filter (e.g. a "coarse" filter element with pores typically larger than 50 microns but smaller than 500 microns). The pre-filter removes coarse detritus from the water and may also filter out some filter materials, including algae. The filtrate from the pre-filter (hereinafter called the "pre-filtrate") then passes to a parallel arrangement of relatively "fine" filter elements (e.g. 1 – 150 micron-size pores) which remove more finely divided suspended or dispersed material. As will be explained subsequently one of the "fine" filters can be a nearly-clogged "coarse" filter. This, in brief, is the "mechanical" aspect of the filtering apparatus and method. The biological aspect of the method centers primarily on one (or more) of the parallel array of "fine" filters, which has been provided with established colonies of living microorganisms (e.g. algae, nitrifying bacteria, and the like). This cultured filter element may have a tendency to resist fluid flow. However, at least one other "fine" filter element is arranged in parallel with thee cultured filter. This additional "fine" filter may or may not be free of bacterial cultures, detritus, and other sources of clogging or flow-resistant effect. As a result, the pre-filtrate is exposed to the beneficial effects of the culture on the cultured filter element, but the alternative (i.e. parallel) pathway through the additional filter element insures that biological filtration need not reduce the total flow rate through the filtration zone. The pre-filter can develop a significant biological filtering action of its own and may eventually behave like a "fine" filter due to partial clogging of its pores. At this point, the pre-filter can be discarded or used as a cultured "fine" filter in the same or a different filtration zone. So long as the filter zone has at least one cultured filter element (a "fine" filter and, optionally, the pre-filter) "new tank syndrome" can ordinarily be avoided. So long as the filter zone contains at least one additional filter element (whether or not cultured and/or clogged) in parallel with a cultured "fine" filter, a loss of flow rate can also be avoided. Having three filter elements also gives the system a much greater "surface area" for filtering efficiency. This greater surface area is helpful even when some or all the filter elements are fresh.

BRIEF DESCRIPTION OF THE DRAWING

FIG. 1 is an isometric perspective view of a complete aquatic life support system constructed according to the principles of this invention.

FIG. 2 is a plan view of the filter system used in the aquatic life support system of FIG. 1.

FIG. 3 is a sectional view taken along line 3—3 of FIG. 2.

DETAILED DESCRIPTION

Figure 4:
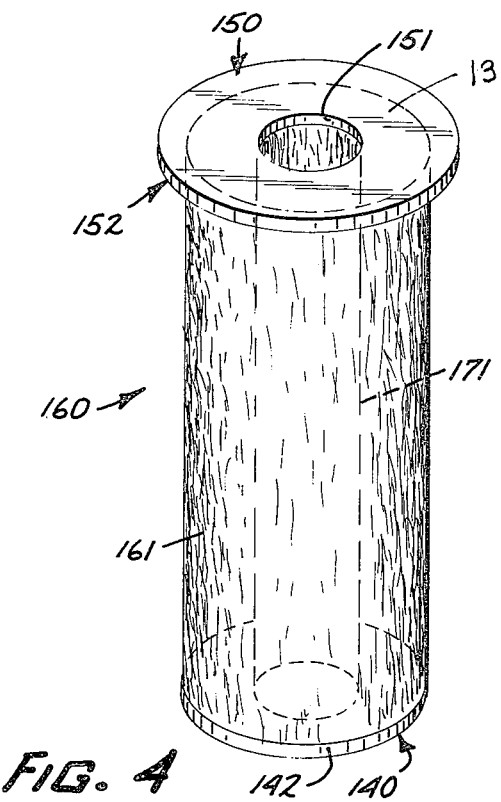
FIG. 4 is a perspective view of a modified filter element useful in a filtration system of this invention.

This invention seeks to maximize the biological action of, and the flow rate through, the external filtration zone of the aquatic life support system. In one embodiment of the invention, a filtration zone of this invention is provided by a single canister with a pre-filtration chamber in fluid communication with the canister inlet or intake. The prefiltrate from the prefiltration chamber passes downstream through a suitable conduit or baffle system or other means for permitting the prefiltrate to be conveyed to a parallel flow chamber. The parallel flow chamber permits the pre-filtrate to apportion itself in a parallel flow through the biological filtering elements and a relatively low resistance, "fine" filter element. The major amount of the parallel flow will follow the less resistant path, but all of the water in the system, through constant recirculation, will eventually be exposed to the beneficial action of the biological filtering element. The filtrate from the parallel flow chamber can pass through additional downstream filtration zones or directly to the canister outlet.

The pre-filtering filtration element preferably is biologically active also. Typically, biological filtering action begins to be significant in a fresh pre-filter after a few days in an established or well "run-in" tank. The time lag may be somewhat longer in a totally fresh tank. The biological filter element in the parallel flow zone can be a "former" prefiltering element which has become so clogged as to be equivalent in pore size to a "fine" filter element. The "fine" biological filter element can alternatively be provided with an enhanced microorganism growth capability by treatment with a suitable nutrient medium and/or by innoculation with suitable algae and/or autotrophic bacteria such as Nitrosomonas sp., Nitrobacter sp., and/or heterotrophic bacteria or the like. In use, the aquarium and the filtration system are preferably operated to favor establishment and maintenance of autotrophic bacterial colonies, e.g. sudden changes in pH or salinity or hardness or soluble carbonate concentration should be minimized or avoided, and antibiotic, bacteriostatic, and bactericidal treatments should generally be avoided completely. Protein skimming can be quite undesirable. Surprisingly, however, high flow rates (e.g. 2 – 20V/hr, where V is the volume of water in the tank) seem to have little, if any, adverse effect upon colonies of autotrophic bacteria in the biological filter elements.

Perhaps the most accurate measure of effectiveness of the filter is the ammonia concentration in the tank and, less importantly, the nitrite concentration. Free ammonia concentration typically drops to essentially zero when the biological filtering action of the method and apparatus of this invention is at peak efficiency. (Free ammonia, $NH_3$, is to be distinguished from the ammonium cation, which can form in acidic media but is ordinarily not present in basic media.) While running in or conditioning a new tank containing more livestock than is generally recommended in the aquarium industry, nitrite levels can exceed 15 or 20 p.p.m. and even reach 50 or 60 p.p.m. or more (e.g. 40 p.p.m.) without apparent harm to many types of aquatic life, including marine or salt-water fish; after conditioning, however, both the nitrite and ammonia levels are well controlled. The lack of harmful results from high nitrite levels during running in or the like is not understood. Although this invention is not based by any theory, it is theorized that the complete or nearly complete elimination of free ammonia ($NH_3$) is more important than maintaining nitrite levels below 15 p.p.m. Furthermore, with a proper run-in period (with a temporarily small fish population) low nitrite levels (below 0.1 p.p.m.) can also be provided with a system of this invention.

This invention is well suited for use with marine aquariums containing sea water or simulated sea water. The characteristics of sea water (a pH of 7.5 – 9; a high chloride ion concentration; high sodium, calcium, and magnesium ion concentrations; decreased dissolved oxygen concentration; etc.) can be accurately duplicated by adding a suitable amount of inorganic salts and the like to tap water or distilled water; see Spotte, op. cit., pp. 93 – 101, and U.S. Pat. No. 2,672,845 (Schneithorst), column 2, lines 8 – 23. Accordingly, the word "water" (as in "aquarium water", "water flow", etc.) is used in this application to include any of the typical aqueous life support media, including simulated sea water.

The essential features of the method of this invention can be considered to be the following steps:

a. depositing a microorganism growth medium and establishing a colony of living nitrifying microorganisms at least on a filtering surface of an essentially integral, solid, porous first filter element, b. providing a plurality of integral, solid, porous additional filter elements, and c. arranging said first filter element and said additional filter elements in said filtration zone in a series-parallel flow relationship, whereby the entire circulating flow from said tank passes first through a first one of said additional filter elements and the filtrate therefrom passes in parallel through said first filter element and a second one of said additional filter elements. That is, proper operation of the method of this invention can provide a "no flow-by" system, wherein contaminated water cannot effectively leak through or flow by the filtration elements.

As this method is preferably practiced, the first of the additional filter elements becomes the filtration element in a pre-filtration zone. The first filter element (i.e. the filter element of step [a]) then becomes the biologically active filtration element in a parallel flow zone containing, in addition, the second of the additional filter elements. All of the circulating flow is thus forced through the pre-filtration zone, and all of the pre-filtrate from the pre-filtration zone is forced through the parallel flow zone. No opportunity for by-pass or leakage around this flow pattern is ordinarily permitted.

Turning now to a detailed description of FIGS. 1, 2, and 3 of the drawing, the complete aquatic life support system 10 shown in FIG. 1 comprises an aquatic life support tank 25 containing water 27 (which can be fresh water, sea water, simulated sea water, or the like), and a filter system 11. The tank 25 is preferably divided into an upper chamber and a lower chamber 23 by a flow control plate 29, as in U.S. Pat. No. 3,722,685. The filter system 11 is provided with an inlet means 13, a filtered water outlet means 15, an air-stripper of aerator outlet means 17, a hanger means 24 for engaging a side wall of the tank 25, a motor housing 21 for the motor which drives the pump element 22 (FIG. 3) inside the filter system, and a hold-down cap 19 which threadedly engages a post 19a (FIG. 2), thereby tightening the removable top 37 (FIG. 3) of the filter canister or housing onto the body 31 of the filter housing. The resulting tight engagement between top 37 (including top and bottom O-ring seals 37a), filter housing body 31, and elements of filter system 11 contained in housing 31 helps to eliminate or virtually eliminate leakage around or by-passing of the filtering surfaces of the cylindrical filter elements 61, 63, and 65 (FIG. 3). Filtration of the water entering filter system 11 is thus as complete as possible.

The body 31 of the filter housing is provided with inlet and outlet means. Inlet means 13 communicates with conduit 14; outlet means 15 communicates with conduit 16 and outlet means 17 communicates with an air-stripper type of aerator 18. As described in detail in the aforementioned U.S. Pat. No. 3,722,685, contaminated water is drawn up through conduit 14 from below flow control plate 29, and filtered and purified water is returned to the lower chamber 23 under flow control plate 29 via conduit 16.

Referring now in more detail to FIGS. 2 and 3, it will be noted that the interior of the body 31 of the filter canister or housing comprises an elaborate system of passageways and baffles designed to route water from inlet 13 through a pre-filtration zone containing pre-filter element 61, from which it is conveyed through passage 51 to a parallel flow chamber containing filter elements 63 and 65. Filter element 65 contains biologically active filter material (e.g. a colony of living nitrifying organisms), which is typically in the form of bacteriologically cultured organic material 66 trapped in the interstices of filter element 65. Filter element 63 is preferably a relatively clean or fresh or freshly cleansed element, so that it creates a relatavely small resistance to fluid flow as compared to filter element 65. The pore size or effective pore size of both filter elements 63 and 65 is preferably much finer than the pore size of pre-filter element 61. The pores of filter element 61 can be 1.2 – 100 times as large as the pores of either one of filter elements 63 or 65. For example, filter element 61 can be a 100, 200, or even 400 micron filter, while filter element 63 is preferable finer than 100 microns and can be as fine as 5 microns.

The filtrate from the parallel flow zone containing filter elements 63 and 65 flows through openings 55 and 57 into the passage 53 which leads to means 15 and 17 via passage or conduit 79. Thus, the "heart" of the pre-filtration zone is the hollow axial core 71 of pre-filter element 61. The "heart" of the parallel flow zone comprises the two hollow axial cores 72 and 73.

Directing the flow of water from inlet 13 through these various zones to outlet 15 and 17 involves walls, baffling elements, and the like defining chambers and passages, some of which have already been referred to. The flow of water, as directed and controlled by these chambers and passages is indicated by arrows. It is preferred that the removable top 37 and the base 35 of the housing for filter system 11 be formed from an inert plastic material. Canister walls 31 and interior baffling walls and elements 41, 42, 43, 44, 45, 46, and 47 are also preferably formed from an inert plastic, so that none of these chambers, passages or baffles in contact with the water will be subject to corrosion and the possible introduction of metallic ions into the water flow. (This can be particularly important in the case of marine aquariums, wherein the aqueous life support medium can be highly corrosive to metals.)

As will be explained subsequently, the biological/mechanical filtration provided by system 11 can be supplemented with charcoal or similar materials.

Figure 5:
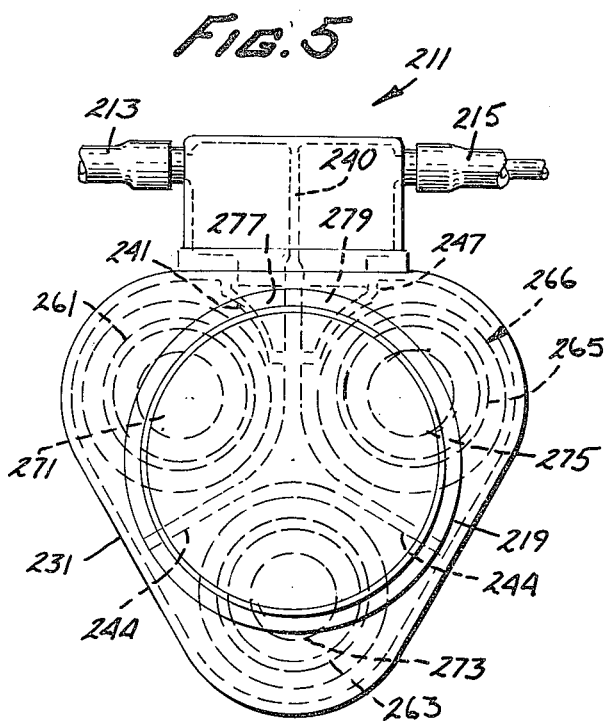
FIG. 5 is a plan view of another embodiment of a filtration system of this invention.

FIG. 5 illustrates another embodiment of a filtration system 211 of this invention. In this embodiment, the inlet 213 communicates with a vertical conduit means 277 which directs the flow from inlet 213 to the bottom of the pre-filtration zone defined by Y-shaped interior wall 244 and exterior housing 231, which zone contains pre-filter element 261. The Y-shape of interior wall 244 and housing 231 also define the parallel flow zone, which contains the low resistance filter element 263 and the biological filter element 265; an extension 240 of wall 244 provides a barrier between inlet 213 and filtrate outlet 215. As in the embodiment of FIG. 3, the water flow is blocked by a flow control element (not shown) at the bottom end of the filter element 261; accordingly, the water flow must pass through the filtering material to reach the hollow axial core, from which it is conveyed to the parallel flow zone. In the parallel flow zone, the pre-filtrate flows through the outer surfaces of filter elements 263 and 265 into hollow axial cores 273 and 275 and the filtrate is collected from both cores 273 and 275 at the bottom end of the parallel flow zone. The filtrate then passes through conduit means 279 to outlet 215.

FIG. 4 illustrates a modified filter element 160 which can be used in a filtration system such as system 211 to obviate the need for some of the built-in flow control elements. The axially hollow, elongated cylindrical woven or non-woven fibrous or cellulosic filter core element 161 defines a hollow axial core 171, just as in the case of the previously described filter elements. However, a concentrically arranged solid cap means 142, integral with an end 140 of element 161, closes off the hollow axial core 171 at that end. A concentrically arranged annular solid cap 137, integral with the other end 150, has a central hole 151 which is in register with hollow axial core 171. An annular lip 152 is provided by annular solid cap 137, due to the greater diameter of cap 137, as compared to the diameter of end 150.

In operation, cap 142 and cap 137 serve a function similar to those elements of FIG. 3, i.e. element 42 and the portion of top 37 closing off the upper end of pre-filter element 61, which direct the flow of unfiltered water through pre-filter element 61 and into the passage 51 to the parallel flow zone.

Figure 6:
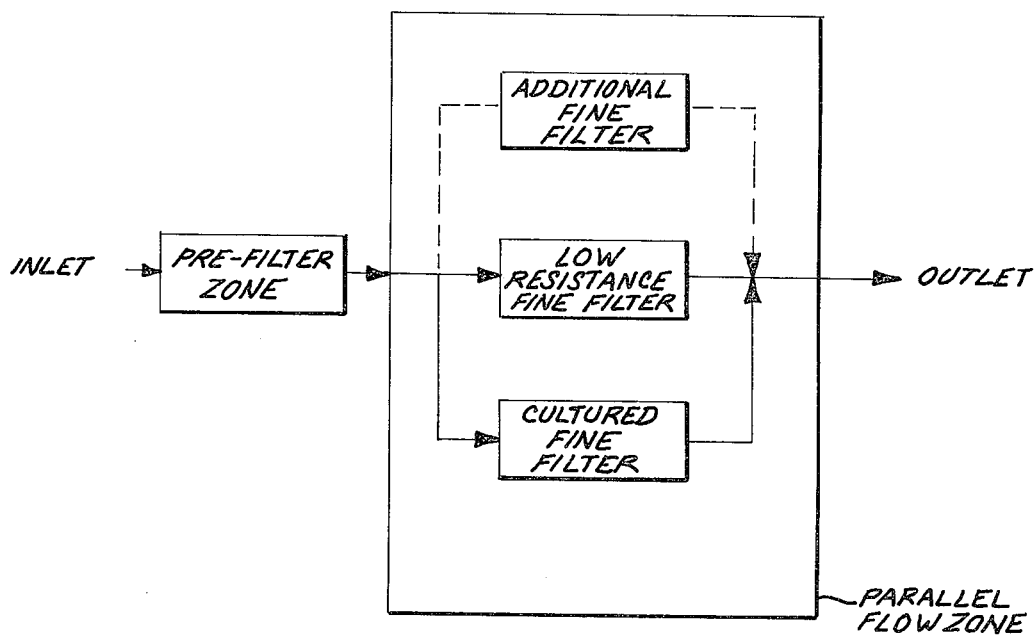
FIG. 6 is a flow sheet illustrating typical arrangement of filter elements in a filtration system of this invention.

FIG. 6 illustrates schematically the inlet-to-outlet flow pattern for a system such as filter system 11 or 211. The pre-filtrate flow from the pre-filter zone is divided between a cultured "fine" filter at at least one other "fine" filter with relatively low fluid flow resistance. One or more additional "fine" filters can be placed in parallel with the culture fine filter and the low resistance fine filter. (In addition, one or more pre-filters can be placed in series in the pre-filter zone, but ordinarily this is not necessary.) The filtrate flow from all the elements in the parallel flow zone is combined and conveyed to the outlet.

A typical mode of operation for the filter system 11 is as follows. A coarse filter element is initially inserted in the pre-filtration zone, and two fine filters are inserted in the parallel flow zone. Top 37 is replaced. After a cultured layer of detritus has built up on the coarse filter element, making it biologically active and reducing its effective pore size to the "fine" level (e.g. 5 – 100 microns), this element is substituted for one of the fine filters in the parallel flow zone and a fresh element 61 is inserted in the pre-filtration zone as indicated in FIG. 3. The fine filter which has been replaced can be discarded or re-used or used in a different filter system. The cultured, formerly coarse filter is now "fine" element 65 (FIG. 3). Top 37 is then replaced again, and hold down cap 19 is screwed down tightly to provide a no-flow-by seal around the filter elements. The filter system 11 has then been "run in" and is in full biological/mechanical filtering operation. A chemical absorption filtering action can be added by inserting charcoal or similar materials into hollow axial cores 71, 73, and 72. Charcoal appears to be effective in removing dissolved organic compounds and carbon dioxide, and in helping to maintain a stable pH. From time to time, element 61 can be replaced or cleansed to keep fluid flow resistance in the system from building up due to clogging of the pores of element 61; if desired, one of "fine" elements 63 and 65 can be replaced, as long as at least one cultured fine filter remains in the parallel flow zone at all times (preferably at least two cultured filter elements under dense population or marine aquarium conditions).

The preferred aquatic life support system 10 of this invention is shown in FIG. 1. The filter system 11, coupled with the flow control plate 29 in tank 25, can enable the aquarist to maintain the maximum number of animals in the healthiest state for the longest period of time. The performance of aquarium 10 is believed to be particularly outstanding with respect to known marine aquarium systems.

If desired, a cultured filter element of this invention can be stored or transported for later use in a filtration system such as system 11 or 211. The living organisms in the culture (e.g. algae or colonies of nitrifying bacteria) can be preserved or lyophilized or the like by ay suitable means prior to transportation or storage. Alternatively, a filter element can be directly treated or impregnated with a standard nutrient medium, thereby supplying the organic material 66 or 266 needed to support a viable colony or nitrifying bacteria. One suitable means for preserving the culture in a latent state which will reactivate within 2 – 3 days is to maintain a cultured filter element in an aqueous medium with an oxygen or air supply adequate for aerobic bacteria; for example, a cultured filter element can be sealed up in a plastic bag with the aqueous medium and the oxygen supply for a limited time (e.g. for rapid shipping to the user), or, preferably, the cultured filter element can be maintained almost indefinitely by floating it in an operating aquarium tank.

As mentioned previously, high flow rates are useful in this invention and not necessarily harmful to fish in a properly constructed and arranged aquarium system (e.g. see FIG. 1 of the Drawing). To illustrate the type of flow rates and pressures used, a 30 gallon aquarium tank would be provided with a flow rate, under preferred conditions, of more than 100 gallons/hour, preferably more than 200 gallons/hour. The gauge pressure for this is greater than 1.0 pounds per square inch (psig), preferably 2 – 7 psig, depending on the amount of fluid flow resistance in the system.

What is claimed is:

1. In a method for preventing the build-up of excessive ammonia levels in the water in an aquatic life support tank, wherein the water in the tank is circulated in a circulating flow out of said tank to a filtration zone and back from said filtration zone into said tank, the improvement which comprises the steps of:
    a. depositing a microorganism growth medium and establishing a colony of living nitrifying a microorganisms at least on a filtering surface of an essentially integral, solid, porous first filter element,
    b. providing a plurality of integral, solid, porous additional filter elements,
    c. arranging said first filter element and said additional filter elements in said filtration zone in a series-parallel flow relationship, whereby the entire circulating flow from said tank passes first through a first one of said additional filter elements and the filtrate therefrom passes in parallel through said first filter element and a second one of said additional filter elements.

2. A method according to claim 1 wherein said step (a) is carried out by circulating the entire circulating flow from said tank through said first filter element prior to said step (c).

3. A method according to claim 1 wherein said filtration zone is divided into a prefiltration zone, through which the entire circulating flow from said tank passes upon reaching said filtration zone, and a parallel flow zone, through which the filtration from said pre-filtration zone passes, and wherein, upon completion of said step (c), said pre-filtration zone has been provided with at least one said additional filter element and said parallel flow zone has been provided with at least said first filter element and at least one of said additional filter elements.

4. A method according to claim 3 wherein said step (a) is carried out by locating said first filter element in said pre-filtration zone until nitrifying microorganisms and particulate material contained in said circulating flow from said tank have been deposited at least on a filtering surface of said first filter element and a living colony of nitrifying microorganisms has been established in the thus-deposited particulate material.

5. A method according to claim 4 wherein said step (c) comprises relocating said first filter element in said parallel flow zone after said living colony has been established and then locating a said one of said additional filter elements in said pre-filtration zone.

6. A method according to claim 1 wherein the pores of said first filter element are 1.2 – 100 times as large as the pores of either one of said plurality of integral, solid, porous filter elements.

7. A method according to claim 6 wherein said filter elements comprise a woven fibrous material.

8. A method according to claim 1 wherein said water in said container is sea water or simulated sea water.

9. A filtration device for filtering the water in an aquatic life support system, comprising:

inlet means communicating with the interior of said device, for providing an influx of water into the device, and outlet means in communication with the interior of said device, for returning filtered water to said aquatic life support system; said interior of said device containing a plurality of elements comprising:

a. a prefiltration housing defining a prefiltration chamber for housing a filter core element, and prefiltration chamber being in liquid communication with said inlet means;

b. a removable, solid, integral, porous prefiltration filter core element housed within said prefiltration chamber;

c. flow-directing means operably associated with said prefiltration housing for continuously directing said influx of water from said inlet means through said porous prefiltration filtering core element;

d. a parallel flow housing defining a parallel flow chamber for receiving the flow from said prefiltration chamber which has passed through said porous prefiltration filtering core element and for housing a plurality of filter core elements, said parallel flow chamber being in liquid communication with said prefiltration chamber;

e. a plurality of removable, solid, integral, porous additional filter core elements housed within said parallel flow chamber upstream from said outlet means, for further filtering the said prefiltrate; at least one of said additional filter core elements containing, at least on the surface thereof, a colony of nitrifying organisms including bacteria; and f. flow-directing means operably associated with said parallel flow housing for continuously directing the flow of water received from said prefiltration chamber through said additional filter core elements housed within said parallel flow chamber.

10. A device according to claim 9 wherein said nitrifying organisms include autotrophic bacteria.

11. A device according to claim 9 wherein said aquatic life support system contains sea water or simulated sea water.

12. A device according to claim 9 wherein said prefiltration housing defines an elongated generally cylindrical chamber and said parallel flow housing defines a parallel array of at least two elongated generally cylindrical chambers, and wherein said prefiltration filter core element and said additional filter core elements are elongated, axially hollow, and generally cylindrical in shape and are coaxially, concentrically, and interchangeably insertable in and removable from any of said prefiltration or parallel flow housings.

* * * * *

UNITED STATES PATENT OFFICE
CERTIFICATE OF CORRECTION

PATENT NO. : 3,957,634
DATED : May 18, 1976
INVENTOR(S) : Henry E. Orensten and Vivian C. Orensten It is certified that error appears in the above-identified patent and that said Letters Patent are hereby corrected as shown below:

```
Column 2, line 1, for "bacterial" read --bacteria--.
Column 2, line 19, for ")Gailitis)" read --"(Gailitis)--.
Column 2, line 21, for "which" read --where--.
Column 2, line 22, for "3,272,717" read --3,273,717--.
Column 2, line 51, for "filter out some filter" read --filter out
    some finer--.
Column 2, line 66, for "thee" read --the--.
Column 3, line 51, for "elements" read --element--.
Column 5, line 68, for "relatatively" read --relatively--.
Column 7, line 43, for "absorption" read --adsorption--.
Column 7, line 68, for "ay" read --any--.
Column 8, line 5, for "or" read --of--.
Column 8, line 35, for "nitrifying a miroor-" read --nitrifying
    microor- --.

Column 9, line 27, for "and" read --said--.
```

Signed and Sealed this

Eighteenth Day of January 1977

[SEAL]

Attest:

RUTH C. MASON
Attesting Officer

C. MARSHALL DANN
Commissioner of Patents and Trademarks